United States Patent [19]
Burger

[11] Patent Number: 5,174,437
[45] Date of Patent: Dec. 29, 1992

[54] ARTICULATED METALLIC BAND APPARATUS, PARTICULARLY FOR CONVEYING HEAVY LOADS

[76] Inventor: Raymond Burger, 7 Place de la Fleur, 68160 Sainte-Marie-aux-Mines, France

[21] Appl. No.: 800,484

[22] Filed: Nov. 29, 1991

[30] Foreign Application Priority Data

Nov. 28, 1990 [FR] France .................. 90 15141

[51] Int. Cl.⁵ .................................... B65G 39/10
[52] U.S. Cl. ............................ 198/842; 198/833; 198/837
[58] Field of Search ............... 198/833, 841, 842, 837

[56] References Cited

U.S. PATENT DOCUMENTS

| | | | |
|---|---|---|---|
| 1,128,138 | 2/1915 | Hill | 198/842 X |
| 1,141,113 | 6/1915 | Gambee | 198/842 X |
| 1,227,005 | 5/1917 | Search | 198/842 X |
| 1,731,609 | 10/1929 | Brayton | 198/842 |
| 2,371,747 | 3/1945 | Faris et al. | 198/833 |
| 3,195,712 | 7/1965 | Boschi | 198/842 X |
| 3,869,574 | 3/1975 | Kume | 198/837 X |
| 3,967,720 | 7/1976 | Arieh | 198/833 |
| 3,985,225 | 10/1976 | Baum et al. | 198/842 X |
| 4,720,008 | 1/1988 | Ufland | 198/841 |

FOREIGN PATENT DOCUMENTS

| | | | |
|---|---|---|---|
| 2636604 | 2/1978 | Fed. Rep. of Germany | 198/833 |
| 2512135 | 3/1983 | France . | |
| 2592695 | 7/1987 | France . | |
| 0568573 | 12/1977 | U.S.S.R. | 198/837 |
| 0975512 | 11/1982 | U.S.S.R. | 198/833 |
| 1339067 | 9/1987 | U.S.S.R. | 198/833 |

Primary Examiner—Robert P. Olszewski
Assistant Examiner—James R. Bidwell
Attorney, Agent, or Firm—Young & Thompson

[57] ABSTRACT

An metallic band apparatus, particularly for the conveyance of heavy loads. At each lateral edge of the band (1) is disposed a conveyor chain (2), each of the metallic plates (1') being connected to at least one of the links (2') of each conveyor chain (2). Sprockets (13) driving the roller chain or chains (4) are disposed, at each end of the apparatus, between the sprockets (11) driving the conveyor chains (2) and on the same shaft (8) as these latter, the drive connection between the two types of sprockets (11, 13) being such that the linear speed of the endless metallic band (1) is equal to twice the linear speed of the roller chains (4).

11 Claims, 3 Drawing Sheets

ARTICULATED METALLIC BAND APPARATUS, PARTICULARLY FOR CONVEYING HEAVY LOADS

The present invention relates to an articulated metallic band apparatus, particularly, but not exclusively, for the conveyance of very heavy loads.

There is known from French Pat. No. 2 512 135 a roller chain constituting means for the displacement under high pressure of a movable surface relative to a fixed surface.

This movable surface is constituted in numerous cases by an endless band encompassing one or several roller chains drawn by at least one motor shaft, provided with sprockets engaging these chains. This endless band ordinarily constituted by steel plates which are rectangular and of the same thickness, articulatedly interconnected, is disposed freely about the roller chains. As a result, no positive mechanical connection is established between the band and the roller chains, the band not thus being driven unless it is sufficiently loaded and absolutely not permitting its displacement upon encountering opposed longitudinal forces. Moreover, no guidance or specific maintenance of the articulated band is provided.

There is also known from French patent application No. 2 592 695 a roller chain with a rack permitting positive mechanical connection between the band and the corresponding roller chain.

Nevertheless, the solution proposed by this document has several drawbacks, particularly the need to use expensive non-standard roller chains and to carry out many high-precision machining operations. Moreover, the suggested roller chain lacks reliability and is subject to rapid wear in use.

Furthermore, in known apparatus, the roller chain and the band are supported by different shafts giving rise to a relatively complicated structure.

The problem faced by the present invention is thus to envision an articulated metal band apparatus having a simple structure, from standard components, requiring no precise machining and whose overall size is small.

The invention also has for its object to permit carrying out the following functions in an articulated metallic band apparatus of the recited type:

the articulated assembly of the plates which between themselves constitute the metallic band;

movement of the band when it is not loaded;

distribution of the tractive and pressure forces exerted on the band and on the roller chains;

maintenance of the band perpendicular to its surface;

guidance of the band under low loads, as well as under high loads.

Finally, the invention has for its object to envision an articulated metallic band apparatus having very low wear in use, as well as very high reliability of operation.

To this end, the invention has for its object an articulated metallic band apparatus, particularly for the conveyance of heavy loads, principally constituted by an endless band surrounding one or several roller chains comprising rollers and circulating about a frame, said band being comprised by articulated metal plates, characterized in that at each lateral edge of the band is disposed a conveyor chain, each of the metallic plates being connected to at least one of the links of each conveyor chain, and in that the sprockets engaging the roller chain or chains are disposed, at each end of the apparatus, between the sprockets engaging the conveyor chains and on the same shaft as these latter, the driving connection between the two types of sprockets being such that the linear speed of the endless metallic band is equal to twice the linear speed of the roller chains.

The invention will be better understood from the following description, which relates to a preferred embodiment, given by way of non-limiting example, and explained with reference to the accompanying schematic drawings, in which.

Figure 1:
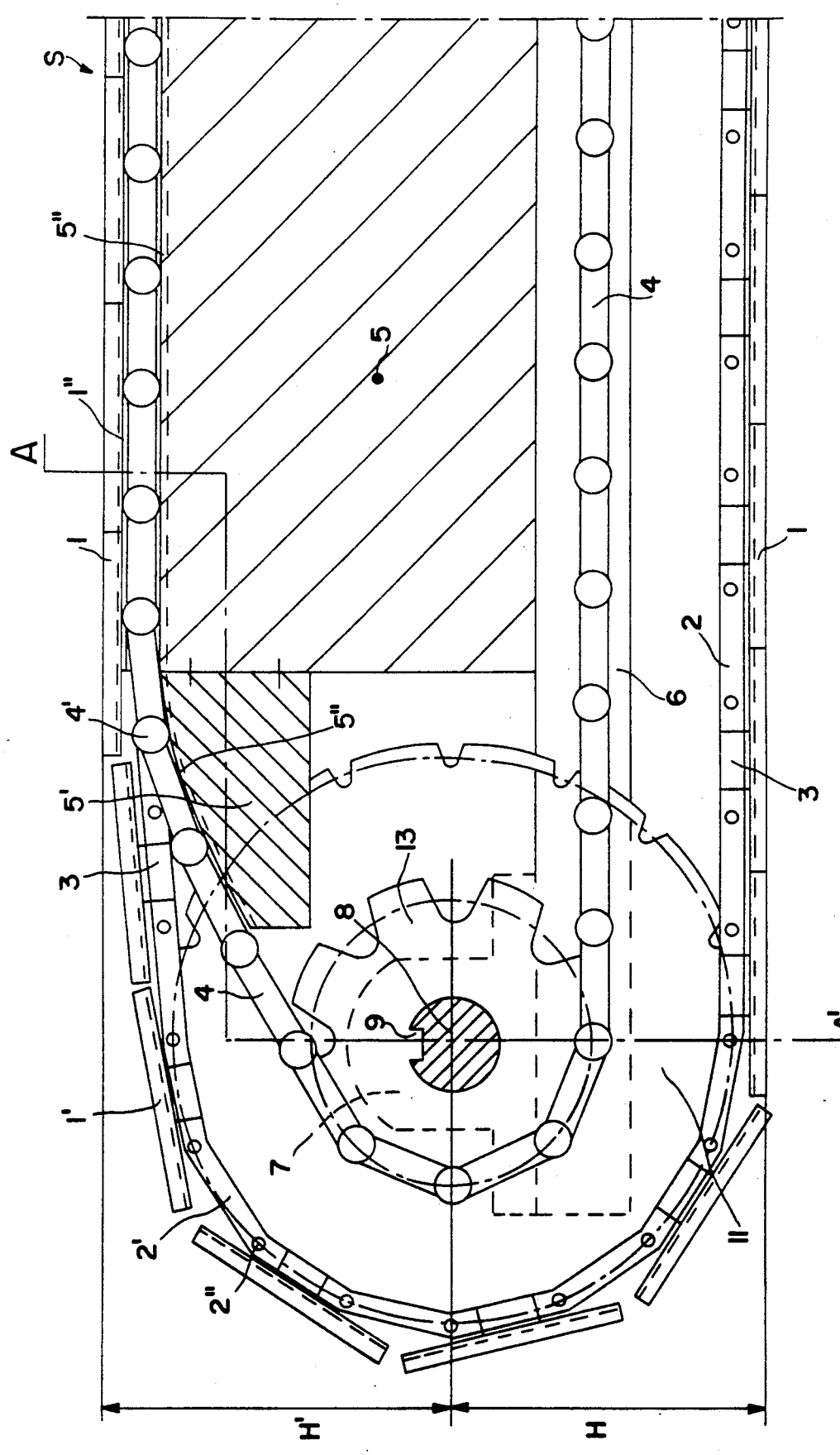
FIG. 1 is a fragmentary side elevational cross-sectional view showing a portion of an apparatus according to the invention.
Figure 2:
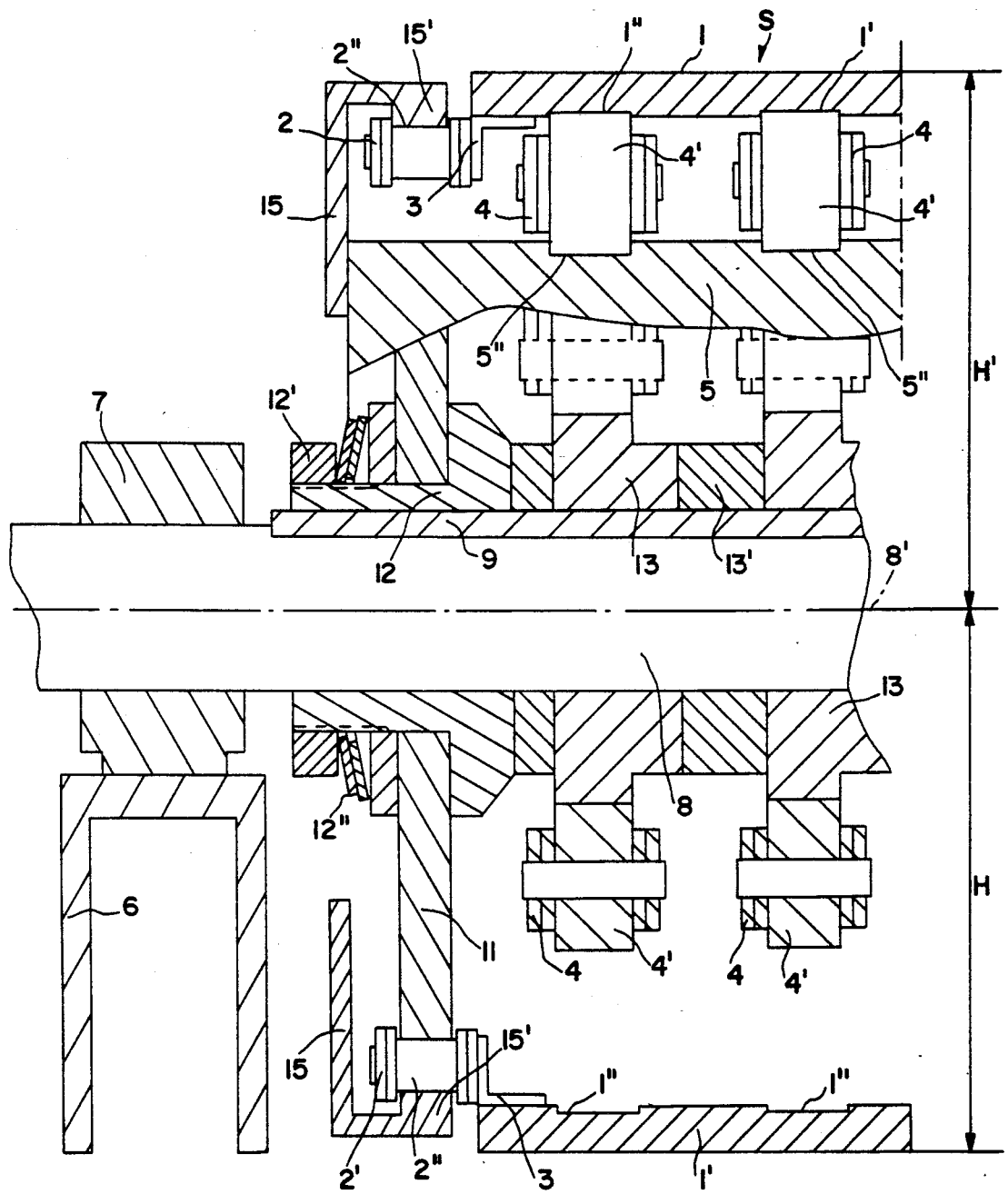
FIG. 2 is a fragmentary cross-sectional view on the line A—A' of the apparatus shown in FIG. 1.

According to the invention and as shown more particularly by way of example in FIGS. 1 and 2 of the accompanying drawings, the articulated metallic band apparatus 1 is characterized in that at each lateral edge of the band 1 is disposed a conveyor chain 2, each of the metallic plates 1' being connected to at least one of the links 2' of each conveyor chain 2, and in that the sprockets 13 engaging the roller chain or chains 4 are disposed, at each end of the apparatus, between the sprockets 11 engaging the conveyor chains 2 and on the same shaft 8 as these latter, the drive connection between the two types of sprockets 11 and 13 being such that the linear speed of the endless metallic band 1 is equal to twice the linear speed of the roller chains 4.

So as to obtain the overall construction of an apparatus according to the invention, it is necessary only to reproduce symmetrically about the dot-dash line in FIG. 1 the portion shown therein.

Similarly, the entire transverse cross section of the apparatus on line A—A' shown in FIG. 1 can be derived from FIG. 2.

As shown in FIG. 1 of the accompanying drawings, the width of the metallic plates 1' is equal to the pitch or a multiple of the pitch of the conveyor chains 2.

According to a preferred embodiment of the invention, the sprockets 11 engaging the conveyor chains 2 have a principal diameter and, when the conveyor chains 2 and roller chains 4 are of the same type, also a number of teeth twice that of the sprockets 13 engaging the roller chains 4.

This arrangement permits physically establishing the 2:1 ratio between the linear speed of the articulated metallic band 1 and the linear speed of the roller chains 4, no matter what the diameter of the rollers 4' of said roller chains 4.

Thus, it is possible to reduce to zero the slippage between the rollers 4' of the roller chain 4 and the metallic plates 1' bearing on these latter and therefore to reduce considerably the wear on said rollers 4'.

The type of roller chains 4 and if desired the conveyor chains 2 used in the invention is preferably that known from the international standard "ISO 1977".

According to a characteristic of the invention, also shown in FIGS. 1 and 2 of the accompanying drawings, the sprockets 11 engaging the conveyor chains 2 and the sprockets 13 engaging the roller chains 4 are keyed to at least one of the two shafts 8, of which only one or both shafts 8 are motor driven.

It is thus possible by means of a unique drive arrangement of the motor-reducer-variator type (not shown) disposed at the end of at least the driven shaft 8, to drive simultaneously and in complementary manner the roller chains 4 and the conveyor chains 2 and thus to distribute the tractive forces as a function of the manner of use of the apparatus according to the invention.

Thus, when the metallic band 1 is subjected to high longitudinal force opposite its direction of movement and at the same time to a relatively low load, a reinforcement of the conveyor chains 2 will be able to overcome the lack of drive of said band 1 by the roller chains 4 and will permit correcting defects of perpendicularity of the plates 1' which can arise under such conditions of use.

In certain applications of the apparatus, particularly when very high translation forces are required relative to the pressure forces, the conveyor chains 2 will be of a type whose resistance to breakage is greater than that of the roller chains 4, the sprockets 11 engaging the conveyor chains 2 being then directly keyed on the shafts 8. In this chase, the conveyor chains 2 would preferably be of type A in the series included in the international standard "ISO 1977", the roller chains 4 being of type B of the same series.

So as to avoid breakage of the chains under extreme conditions of use, the drive sprockets 11 engaging the conveyor chains 2 are secured to the corresponding driven shaft 8 by means of a torque limiter 12, preferably of the adjustable friction type.

The maximum tractive force that can be applied to the conveyor chain 2 can be determined by acting on an adjustment nut 12' comprising a plurality of elastic rings 12", preferably of the Belleville type, bearing directly or via a supplemental member on the sprockets 11 engaging the conveyor chains 2 (FIG. 2), permitting adjustment of the force of securement of said sprockets 11 to the corresponding driven shaft 8.

The sprockets 13 engaging the rollers chains 4 are preferably disposed offset in rotation relative to each other on the shafts 8, such that the rollers 4' of the roller chains 4 constitute staggered bearing points for the plates 1' of the metallic band 1 on the frame 5.

Each shaft 8 thus comprises several sprockets 13 keyed by means of a key 9, as a function of the number of roller chains 4 present, said sprockets 13 being separated by spacers 13' and disposed between sprockets 11 engaging the conveyor chains 2. The shafts 8 are maintained in corresponding bearings 7 disposed symmetrically on each lateral side of the apparatus and at each of its ends, said bearings 7 being secured to the frame 5 by means of supports 6.

As shown in FIG. 2 of the accompanying drawings, the metallic plates 1' constituting the articulated metallic band 1 are secured to the links 2' of the conveyor chains 2 by means of members 3 in the form of brackets, said conveyor chains 2 comprising rollers 2' whose diameter is less than the width of the links 2' and rolling on upper and lower guide and support rails 15 at the level of the corresponding roller tracks 15'.

Thus the maintenance of the metallic band 1 in a direction perpendicular to the plane of the apparatus according to the invention is insured, not only at the level of the upper surface of said apparatus, comprising the movable operating surface S, but also at the level of its lower surface, where the return trajectory of the roller chains 4 and of the articulated metallic band 1 is located.

In operation, the rollers 2" of the conveyor chains 2 bear on the rolling tracks 15' of the upper and lower rails 15 secured to the frame 5.

Furthermore, the frame 5, as well as the metallic plates 1', at the level of their lower surfaces facing the frame 5, comprise grooves 1" and 5" of a width substantially equal to the width of the rollers 4' of the roller chains 4, ensuring the guidance of the articulated metallic band 1 and of the roller chains 4.

As a result, the upper rails 15, by their action on the rollers 2", maintain the rollers 4' of the roller chains 4 trapped in the grooves 1" and 5", respectively of the metallic plates 1' and of the frame 5, thereby ensuring optimum guidance of the metallic band 1 and therefore of the movable surface, even under very high pressure forces.

The lower rails 15 play a supporting role, the return run of the band 1 bearing with its own weight on the roller track 15'.

According to an embodiment of the invention, shown particularly in FIG. 1 of the drawings, the distance H' between the axis 8' of the shafts 8 and the movable working surface S formed by the plates 1' of the articulated metallic band 1 is greater than the distance H constituted by the radius of the sprockets 11 engaging the conveyor chains 2 plus the thickness of said plates 1', thereby permitting the provision, by integrating in the same structure two apparatuses according to the invention, whose movable working surfaces are opposed, a continuous press which can operate at very high pressures.

Under these circumstances, the frame 5 also comprises, at each of its ends, an inclined ramp 5', preferably concave, which bends the path of the roller chains 4 toward the corresponding sprocket 13.

These inclined ramps 5' also have grooves 5" for the guidance of rollers 4' of roller chains 4, disposed in prolongation of the grooves 5" of the frame 5.

Figure 3:
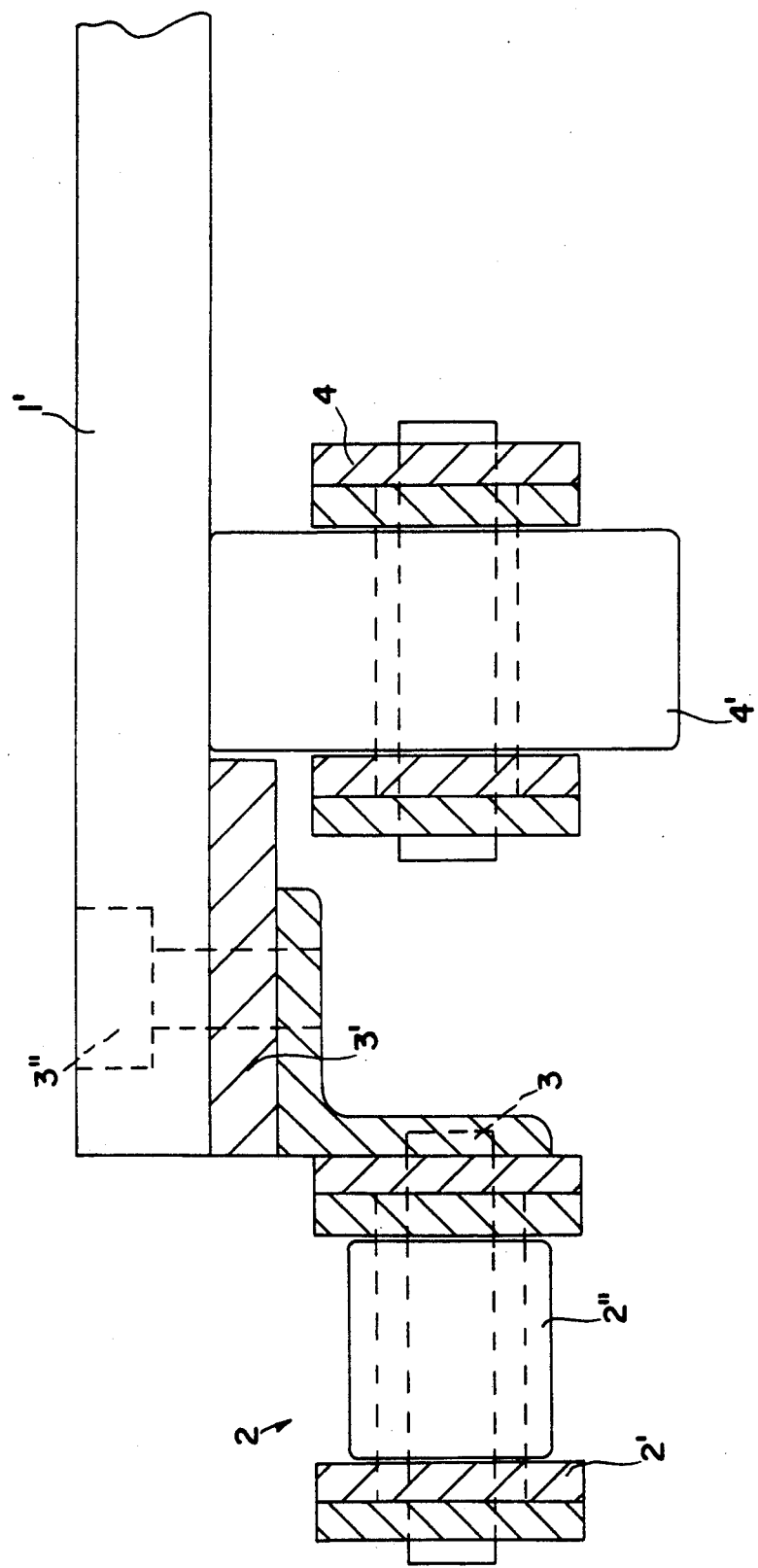
FIG. 3 is a detail cross-sectional view of the end of a metallic plate comprising a portion of the apparatus shown in FIG. 1, according to a modified form of the invention.

According to a modified form of the invention, shown in FIG. 3 of the accompanying drawings, each end of the metallic plates 1' comprises a small guide plate 3' disposed between said metallic plates 1' and the corresponding brackets 3, the assembly being effected by means of suitable bolts or screws 3". The internal edges of these small guide plates 3' having a length identical to or slightly less than the width of the metallic plates 1', constitute lateral abutments for the outer rollers 4' of the roller chains 4.

It is thus possible to avoid heavy wear on the metallic plates, generally composed of a very hard rolled steel, so as to provide grooves 1" and substantially to reduce the required thickness of said metallic plates 1'.

Nevertheless, when the sprockets 11 driving the conveyor chains 2 are all keyed on the corresponding shafts 8 and the drive sprockets 11 secured to the drive shaft 8 are mounted freely, the guidance of the metallic band 1 by means of grooves 1" or little plates 3' is not absolutely necessary, the perpendicularity of the metallic plates 1' relative to the direction of movement being ensured by the conveyor chains 2.

Thanks to the invention, it is accordingly possible to provide an articulated metallic band apparatus permitting fulfilling all the previously-recited functions, and in the form of a simple structure of small volume having high reliability particularly due to low wear of its constituent parts in use, as well as low cost arising from the use of numerous standard parts and a limited number of machining operations.

The apparatus according to the present invention can particularly be used in the field of continuous compression under high pressure (fabrication of panels with the aid of binders), transfer of products under high pressure (drawing) or again the transportation of heavy vehicles (excavators, shovels).

Of course, the invention is not limited to the embodiments described and shown in the accompanying drawings. Modifications remain possible, particularly as to the construction of the various parts or by substitution of technical equivalents, without thereby departing from the scope of protection of the invention.

I claim:

1. Articulated metallic band apparatus comprising an endless band encircling at least one roller chain comprising rollers and circulating about a frame, said band being comprised by articulated metallic plates, a conveyor chain (12) secured to each lateral edge of the band (1), each of the metallic plates (1') being connected to at least one of the links (2') of each conveyor chain (2), sprockets (13) driving the roller chain or chains (4) disposed, at each end of the apparatus, between sprockets (11) driving the conveyor chains (2) a drive shaft (8) on which the two types of sprockets (11, 13) are mounted and by which the two types of sprockets (11, 13) are driven in rotation, the two types of sprockets (11, 13) being such that the linear speed of the endless metallic band (1) is equal to twice the linear speed of the roller chains (4).

2. Device according to claim 1, characterized in that the width of the metallic plates (1') is equal to the pitch or to a multiple of the pitch of the conveyor chains (2).

3. Device according to claim 1 characterized in that the sprockets (11) driving the conveyor chains (2) have, when the conveyor chains (2) and roller chains (4) are of the same type, a number of teeth twice that of the sprockets (13) driving the roller chains (4).

4. Device according to claim 1 characterized in that the sprockets (11) driving the conveyor chains (2) and the sprockets (13) driving the roller chains (4) are keyed on at least one of the two shafts (8).

5. Apparatus according to claim 1, characterized in that the drive sprockets (11) driving the conveyor chains (2) are secured to the corresponding driven shaft (8) by means of a torque limiter (12), preferably of the adjustable friction type.

6. Apparatus according to claim 1, characterized in that the sprockets (13) driving the roller chains (4) are disposed offset relative to each other on the shafts (8), whereby the rollers (4') of the roller chains (4) constitute staggered bearing points for the plates (1') of the metallic band (1) on the frame (5).

7. Apparatus according to claim 1, characterized in that the metallic plates (1') are secured to the links (2') of the conveyor chains (2) by means of members (3) in the form of brackets, said conveyor chains (2) comprising rollers (2") whose diameter is less than the width of its links (2') and circulating on upper and lower guidance and maintenance rails (15).

8. Apparatus according to claim 1, characterized in that the distance (H') between the axis (8') of the shafts (8) and the movable working surface (S) formed by the plates (1') of the articulated metallic band (1) is greater than the distance (H) comprised by the radius of the sprockets (11) driving the conveyor chains (2) plus the thickness of said plates (1').

9. Apparatus according to claim 8, characterized in that the frame (5) comprises, at each of its ends, an inclined ramp (5'), preferably of concave shape, bending the path of the roller chains (4) toward the corresponding sprocket (13).

10. Apparatus according to claim 9, characterized in that the metallic plates (1'), the frame (5) and the inclined ramp (5') have grooves (1" and 5") of a width substantially equal to the width of said rollers (4') of the roller chains (4), ensuring the guidance of the articulated metallic band (1) and of the roller chains (4).

11. Apparatus according to claim 1, characterized in that each end of the metallic plates (1') comprises a small guide plate (3') disposed between said metallic plates (1') and the corresponding brackets (3), the assembly being effected by means of suitable bolts or screws (3").

* * * * *